United States Patent [19]

Inden et al.

[11] Patent Number: 5,679,835

[45] Date of Patent: Oct. 21, 1997

[54] MODIFIER COMPOSITION AND A MODIFIED POLYMER

[75] Inventors: Yoshimi Inden; Nami Gyotoku; Tadashi Yamauchi; Nobuo Hisada, all of Kyoto, Japan

[73] Assignee: Sanyo Chemical Industries, Ltd., Kyoto, Japan

[21] Appl. No.: 617,171

[22] Filed: Mar. 18, 1996

[30] Foreign Application Priority Data

Mar. 17, 1995 [JP] Japan .................................. 7-086452

[51] Int. Cl.$^6$ .................................................. C07C 69/52
[52] U.S. Cl. .................................... 560/222; 525/193
[58] Field of Search ........................... 560/222; 525/193

[56] References Cited

U.S. PATENT DOCUMENTS

| | | | |
|---|---|---|---|
| 2,093,576 | 9/1937 | Seqessemann | 560/222 |
| 3,024,221 | 3/1962 | Le Fevre | 560/222 |
| 3,541,059 | 11/1970 | Schaper | 560/222 |
| 4,163,755 | 8/1979 | Matsuda | 560/222 |

FOREIGN PATENT DOCUMENTS

| | | |
|---|---|---|
| 280165 | 8/1988 | European Pat. Off. . |
| 280166 | 8/1988 | European Pat. Off. . |
| 3284157 | 11/1988 | Japan . |

*Primary Examiner*—Paul J. Killos
*Attorney, Agent, or Firm*—Oblon, Spivak, McClelland, Maier & Neustadt, P.C.

[57] ABSTRACT

A modifier composition useful for the preparation of a modified polymer which includes:

(1) a compound represented by the general formula (1):

$$[CH_2=\overset{R}{\underset{|}{C}}-CO(OA)_nOSO_3]_mM \qquad (1)$$

wherein R is a hydrogen atom or a methyl group, A is an alkylene group having 2–4 carbon atoms, $(OA)_n$ indicates a polyoxyalkylene group, M is a monovalent or divalent cation, n is 2–30, and m is 1 or 2;

(2) 50–3,000 ppm, based on the weight of the modifier composition, of an organic polymerization inhibitor; and (3) 0.01–20 ppm of copper ion, based on the weight of the composition;

a modified polymer containing the modifier composition and method for producing the modified polymer are provided, wherein the modifier composition has excellent thermal shelf stability at ordinary temperatures.

18 Claims, No Drawings

MODIFIER COMPOSITION AND A MODIFIED POLYMER

BACKGROUND OF THE INVENTION

1. Field of the Invention

The present invention relates to a composition for use as a polymer modifier for polymers of ethylenically unsaturated monomers, a modified polymer containing the same, and a process for producing a modified polymer, wherein the modifier composition has excellent thermal shelf stability.

2. Description of the Prior Art

It is known to use a sulfated ester or its salt as polymer modifier, illustrated below by general formula (a), in order to modify polymers; particularly a polymer or copolymer of ethylenically unsaturated monomers, such as (meth) acrylonitriles (in the context of the present invention the use of the term "(meth)acyl" includes both acrylic and methacrylic based compounds), styrene, butadiene, (meth)acrylic acid and salts and esters thereof, vinyl chloride, vinylidene chloride and the like (Japanese Patent KOKAI Nos. 170611/1985 and 34947/1987).

(a)

wherein R is hydrogen atom or methyl group, A is an alkylene group having 2–4 carbon atoms, (OA)n indicates a polyoxyalkylene group, M is a monovalent or divalent cation, n is 2–30, and m is 1 or 2.

However these sulfated esters or salts have poor thermal shelf stability against polymerization, and must necessarily be stored at a lower temperature. Furthermore, even when stored at a lower temperature, the ester may cause an undesirable partial polymerization as a by-product, and may reduce the effect of the modifier.

SUMMARY OF THE INVENTION

Accordingly, one object of the present invention is to provide a modifier composition for polymers having improved thermal shelf stability.

Another object of the present invention is to provide a modified polymer containing the modifier composition.

A further object of the present invention is to provide a method for preparing the modified polymer.

These and other objects of the present invention have been satisfied by the discovery of a composition useful as a polymer modifier, comprising;

(1) a compound represented by formula (1)

(1)

wherein R is a hydrogen atom or a methyl group, A is an alkylene group having 2–4 carbon atoms, (OA)n represents a polyoxyalkylene group, M is a monovalent or divalent cation, n is 2–30, and m is 1 or 2;

(2) 50–3,000 ppm, based on the weight of the composition, of an organic polymerization inhibitor selected from the group consisting of phenols, hydroquinones and amines; and (3) 0.01–20 ppm of copper ion based on the weight of the composition.

DETAILED DESCRIPTION OF THE PREFERRED EMBODIMENTS

In the present invention, the compound of formula (1) can be a sulfated ester (A1) or its salt (A2). Also in the general formula (1), R is a hydrogen atom or methyl group.

In the group $(AO)_n$, suitable examples of alkylene group A include alkylene groups having 2–4 carbon atoms, such as ethylene, propylene and butylene. Preferred alkylene groups are ethylene and propylene. The alkylene group together with oxygen atom forms oxyalkylene group AO. Plural oxyalkylene groups may be the same or different from each other, and may be present in a block or random order. Preferable examples of an oxyalkylene group include oxyethylene, oxypropylene or a combination thereof. More preferably, the polyoxyalkylene group comprises at least 2 oxypropylene units.

M is a monovalent or divalent cation. Suitable examples of M include: proton; alkali metal cations, such as lithium, sodium and potassium cations; alkaline earth metal cations, such as calcium and magnesium cations; ammonium cations; organic amine cations, such as an alkanol amine or a lower alkyl amine. Among these, alkali metal cations and ammonium cation are preferable.

n is 2–30, preferably 3–15. If n is lower than 2, the compatibility of each monomer and copolymerizability become insufficient. If n is higher than 30, copolymerizability becomes poor.

Preferred examples of sulfated ester (A1) are shown below by the general formulae (2) and (3).

(2)

wherein, a is 3–20.

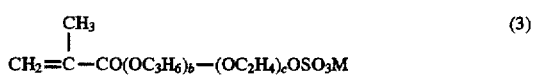

(3)

wherein, b is 5–15 and c is 1–5.

Moreover, in formula (3), the oxypropylene and oxyethylene groups may be present either blockwise or randomly.

A more preferred embodiment of compound of general formula (1) is the sulfated ester (A1) or its salt (A2) wherein a is 8–10.

In another embodiment of the present invention, two processes are provided for producing a sulfated ester (A1). These methods include:

(1) a method of coupling an alkylene oxide to (meth) acrylic acid or hydroxyalkyl (meth)acrylate, followed by sulfating the product with a sulfating reagent and, if necessary, making the salt thereof; and (2) a method of esterifying polyalkylene glycol monosulfate ester or its salt with (meth)acrylic acid and then, if necessary, making the salt thereof.

In connection with method (1), suitable methods for coupling alkylene oxide to (meth)acrylic acid or hydroxyalkyl (meth)acrylate include: addition of an alkylene oxide to (meth)acrylic acid, hydroxyethyl or hydroxypropyl (meth)acrylate or a dehydrating condensation of polyalkylene glycol with (meth)acrylic acid.

Suitable sulfating reagents for use in method (1) include sulfuric acid, fuming sulfuric acid, chlorosulfuric acid and sulfamic acid, with sulfamic acid being preferred. By using sulfamic acid, an ammonium salt is obtained, which may be used without any neutralization. If desired, the ammonium salt may be salt exchanged with an alkali or alkaline earth metal hydroxide.

Before the sulfating step, both an organic polymerization inhibitor and copper ion are essential for preventing polymerization. In the sulfating reaction, suitable methods of controlling the amount of the organic polymerization inhibitor or copper ion include:

(1) adding thereto the organic polymerization inhibitor and copper ion to provide a final amount of 50–3,000 ppm and 0.01–20 ppm respectively, or (2) adding excess organic polymerization inhibitor and copper ion before the sulfating reaction, followed by eliminating any excess of the two to obtain the levels required by the present invention. The elimination of excess inhibitor and copper can be performed using conventional techniques such as adsorption or extraction from a two phase system.

The latter method (2) is preferred in the present invention since it helps prevent polymerization during the sulfating reaction.

Furthermore, the sulfation reaction may be carried out with addition of a urea compound for the prevention of coloring.

The salt of the sulfated compound may be prepared by neutralization with an alkali or alkaline earth metal hydroxide, aqueous ammonia or an organic amine.

Suitable examples of organic polymerization inhibitor (B) include: phenols, including hindered-phenols such as 2,6-di-tert.-butyl-4-methylphenol; and 2,4-dimethyl-6-tert.-butylphenol; hydroquinones, such as hydroquinone, hydroquinone monomethyl ether; pyrogallol and amines, such as phenothiazine and diphenylamine. Hydroquinone monomethyl ether and phenothiazine are most preferred.

The organic polymerization inhibitor is used in an amount sufficient to prevent polymerization of the polymer modifiers of the present invention under storage conditions, but still allow polymerization of a modified polymer containing the modifier. Preferably, the amount used in the range of 50–3,000 ppm, most preferably 300–1,500 ppm based on the total weight of the modifier composition. The use of the organic polymerization inhibitor at a level lower than 50 ppm may cause polymerization during storage over time. Amounts over 3,000 ppm may cause inhibition of polymerization during the preparation of a modified polymer containing the modifier.

Suitable examples of a copper compound capable of forming copper ion (C) include copper(II) chloride, copper (II) sulfate and copper(II) hydroxide. The copper compound may form a salt or may complex with one of the other components in the composition.

The copper ion is generally used in the range of 0.01–20 ppm, preferably 0.1–10 ppm, more preferably 0.1–5 ppm based on a total weight of the composition. The use of copper ion at levels lower than 0.01 ppm may cause polymerization during storage over time, while a level over 20 ppm may cause inhibition of polymerization during preparation of a modified polymer containing the modifier composition of the present invention.

A buffering agent may also be incorporated in the present modifier composition in order to improve the thermal shelf stability.

Suitable buffering agents include, salts (such as sodium, potassium and ammonium salts) of organic acids (such as citric, tartaric, malic, lactic and acetic acids), and salts of phosphoric acid. These buffering agents may be used singly or combined. Among these, organic acids and salts thereof are preferred, with sodium hydrogen citrate and sodium citrate being most preferred.

The buffering agent is generally used in the range of 50–5,000 ppm, preferably 2,500–3,000 ppm based on the total weight of the composition.

The modifier composition of the invention may be used for modification of polymers, preferably polymers of ethylenically unsaturated monomers, which are used for preparing such products as synthetic resins, rubbers, fibers or resin emulsion.

Suitable examples of ethylenic monomers include (1) nitrile group containing monomers, such as (meth) acrylonitriles, (2) esters of unsaturated carboxylic acid, such as $C_{1-20}$ alkyl (linear or branched, such as methyl, ethyl, butyl and 2-ethylhexyl) (meth)acrylates; glycol (such as ethylene glycol, propylene glycol, 1,4-butane diol, polyethylene glycol and polypropylene glycol) (meth)acrylates; mono and diesters of maleic acid, fumaric acid and itaconic acid, (3) amides of unsaturated carboxylic acids, such as (meth) acrylamide, (4) halogen-containing monomers, such as vinyl chloride, vinylidene chloride and chloroprene, (5) aromatic vinyl monomers, such as styrene, α-methyl styrene and vinyl toluene, (6) aliphatic hydrocarbon monomers, such as $C_{2-10}$ olefins, for example, ethylene and propylene; and $C_{4-10}$ dienes, for example, butadiene and isoprene, (7) vinyl esters or (meth)allyl esters, such as vinyl acetate, vinyl propionate, divinyl phthalate, diallyl phthalate and allyl acetate, (8) unsaturated carboxylic acids and salts thereof, such as (meth)acrylic acid, maleic acid, fumaric acid and itaconic acid and salts thereof.

The amount of the modifier composition used in preparing a modified polymer varies in accordance with the kind of polymer, the composition of monomers, the purpose of the modification or performance requirements. The amounts used can be readily determined by one of ordinary skill in the polymer arts. Exemplary embodiments are listed below.

In producing a hydrophobic polymer for the purpose of imparting dyeing properties and antistatic properties, it is better that the modifier composition of the invention is contained in an amount of 0.1–10% by weight, preferably 0.2–5% by weight based on the weight of the modified polymer. A polymer containing less than 0.1% by weight has poor dyeing properties and antistatic properties, while a polymer containing over 10% by weight is too hydrophilic.

In producing a resin emulsion capable of providing dry films having improved water resistance and adhesive properties, it is better that the modifier composition of the invention is contained in an amount of 0.1–20% by weight, preferably 0.5–5% by weight, based on the weight of the modified polymer emulsion. A polymer containing less than 0.1% by weight has poor thermal shelf stability, while a polymer containing over 20% by weight impairs water resistance of the dry films and adhesive properties.

Suitable methods for modifying a polymer with the modifier composition of the present invention include copolymerization of an ethylenically unsaturated monomer with the modifier composition of the invention. Illustrative polymerization methods are bulk polymerization, solution polymerization, suspension polymerization and emulsion polymerization. Polymerization can be carried out blockwise, randomly or graftwise.

Initiation methods include irradiation, such as by electron beam, γ-ray or ultraviolet; by heating; and using chemical initiators, such as radical, cationic or anionic initiators.

Suitable examples of chemical initiators include persulfates (such as ammonium and potassium persulfates), peroxides (such as benzoyl, lauroyl and hydrogen peroxides), azo initiators (such as azobisisobutyronitrile) and redox initiators (such as combinations of sulfite with peroxide, and hydrogen peroxide with ferric ion).

When solution polymerization is used, suitable solvents include dimethyl formamide, dimethyl acetamide and a concentrated aqueous solution of zinc chloride.

When suspension polymerization or emulsion polymerization is used, suitable examples of a dispersion medium include a mixture of water and one or more water-soluble solvents (such as methanol, isopropyl alcohol or acetone).

In the polymerization, chain transfer agents (such as mercaptans) and dispersing agents (such as partially saponificated polyvinyl acetate) may also be used.

The modifier composition of the present invention is useful as an emulsifying agent in emulsion polymerization, with or without other emulsifiers.

Suitable examples of other usable emulsifiers include anionic surfactants (such as sodium dodecyl benzene sulfonate and sodium lauryl ester sulfonate); and nonionic surfactants (such as polyoxyethylene alkyl phenyl ether and polyoxyethylene alkyl ether).

The amount of other emulsifiers is limited based on performance requirements, such as water resistance of the dry film.

The polymerization temperature varies depending on various factors, such as the method of polymerization, and the kind of monomers used. A suitable range of polymerization temperature is from −5° to 150° C., preferably from 25° to 100° C.

Furthermore, other anionic monomers, such as (meth) acrylic acid, sulfopropyl (meth)acrylate, sulfopropyl (meth) acrylamide and styrene sulfonic acid, may be used with the modifier. In that case, the amount of the modifier of the present invention is preferably at least 20%, more preferably at least 50% based on the total weight of the modifier and the anionic monomer.

The modifier of the present invention can provide: (1) a higher degree of polymerization, (2) a modified polymer of improved performance (such as degree of polymerization, antistatic properties, dyeability), (3) a polymer emulsion of improved mechanical stability, chemical stability and low-foaming properties, (4) a water-resistant dry film of the modified polymer emulsion, (5) a dry film without impairing transparency of the modified polymer, (6) hydrophilicity, (7) reduced adhesion of dry soil, dust and dirt on the surface of the dry film and greater ease of their removal, (8) a polymer emulsion which does not effuse an emulsifying agent into waste water in the case of withdrawal of the polymer from emulsion.

The present modified polymers are useful as synthetic resins, synthetic fibers, resins for fabric treatment, paper coatings, and resins for hair-spray. The present polymer emulsions are also useful for preparing adhesives, coatings, impregnating and dispersion. Furthermore, these polymers are useful as aqueous coatings, aqueous adhesives, textile processing aids (such as fabric size, binders for non-woven), fiber modifiers, floor polishers, solid stabilizers, and concrete or mortar homogenizing agents. The present modifier is useful for manufacturing synthetic resins (such as poly vinyl chloride, ABS resin), synthetic rubbers, and synthetic fibers, etc.

Having generally described the invention, a more complete understanding can be obtained by reference to certain specific examples, which are included for purposes of illustration only and are not intended to be limiting unless otherwise specified.

EXAMPLES

In the following examples, part, parts and % mean part by weight, parts by weight and % by weight, respectively.

The measuring and evaluating methods and conditions were as follows:

(1) Copper ion content

Absorption was measured with an atomic absorption spectrophotometer (HITACHI 180-80) detected at 324.8 nm, and copper ion content was calculated from a calibration curve of absorbance.

(2) Hydroquinone monethyl ether content

Absorption was measured with a spectrophotometer (HITACHI U-1000) detected at 420 nm, and content of hydroquinone monethyl ether was calculated from a calibration curve of absorbance.

(3) Measurement of polymer content

Polymer content was measured by HPLC, calculating from the HPLC trace the ratio of an area of polymers to that of a monomer.

HPLC conditions were as follows:
Equipment: LC-LOAD produced by SHIMADZU Corp.
Columns: Shodex OH pack SB-802.5(8φ, 300 mm) produced by SHOWA DENKO K.K.
Mobile phase: methanol/high purity deionized water: 57/43 (volume/volume)
Flow rate: 0.6 ml/minutes
Injection volume: 10 μl
Detector: differential refractometer (4) Polymer content of by-product during preparation The polymer content of by-product was measured by HPLC and measurement conditions and calculation were those mentioned above.

(5) Polymer content of by-product during storage

The obtained modified polymers were kept in a thermostatic chamber at 50° C. for 3 months and thereafter the polymer content of the produced by-product during storage was also measured by HPLC, as above.

(6) Polymerizability

The modified polymer was obtained (Example 2–9 and Comparative example 1–6) and polymerizability was measured as follows:

Into a flask equipped with a stirrer and dropping funnel, were charged 1.6 parts of modifier composition, 22 parts of styrene, 18 parts of butyl acrylate, 117.5 parts of deionized water, 0.16 part of ammonium persulfate and 0.08 part of sodium bicarbonate, followed by stirring to emulsify them. After the atmosphere in the flask was substituted with nitrogen, the mixture was polymerized at 75° C. for 0.5 hours. Then an emulsified mixture of 5.6 parts of modifier composition, 77 parts of styrene, 63 parts of butyl acrylate, 134.5 parts of deionized water, 0.56 part of ammonium persulfate and 0.28 part of sodium bicarbonate, was added thereto dropwise for 2 hours, followed by polymerization at 80° C. After addition of 18 parts of 1% aqueous ammonia, the temperature was elevated up to 85° C., followed by polymerization for 2 hours, to obtain a modified polymer.

After drying 1.5 g of the obtained polymer emulsion at 130° C. for 1.5 hours in a thermostatic chamber, the residual material was measured. The polymerization conversion of monomer was calculated from the ratio of the weight of a measured non-volatilizable residue to the weight of the theoretical solid content in the case of a completely polymerized product, considering the weight of water, emulsifying agent, initiator and solvent contained before drying.

(7) Polymerization conversion

The polymerization conversions of the modified polymers obtained in example 10 and comparative example 7 were calculated in the same manner as above-mentioned (6).

(8) Agglomerate content

Each polymer emulsion in example 10 or comparative example 7 was filtered through a 150 mesh wire cloth to collect an agglomerate. The gained agglomerate residue was washed with water and dried at 130° C. for 5 hours, followed by weighing. Content was calculated from the ratio of the weight of dried agglomerate to the weight of used monomers.

(9) Mechanical stability of polymer emulsion

Each polymer emulsion in example 10 or comparative example 7 was charged into a beaker and stirred with a homomixer at 10,000 rpm for 30 minutes. The produced agglomerate was filtered through 150 mesh wire cloth to collect an agglomerate. The gained agglomerate residue was washed with water and dried at 130° C. for 5 hours, followed by weighing. Content was calculated from the ratio of the weight of dried agglomerate to the weight of solid content of emulsion.

(10) Chemical stability of polymer emulsion

Each polymer emulsion in example 10 or comparative example 7 was diluted with water to prepare a concentration of 0.5% emulsion. $\frac{1}{10}$N aqueous calcium chloride solution was added to 50 ml of the diluted emulsion, and the volume (ml) of the solution caused to agglomerate was measured.

(11) Foaming properties of polymer emulsion

Each polymer emulsion in example 10 or comparative example 7 was diluted with water to prepare a concentration of 3% emulsion. 30 ml of the diluted emulsion was charged into 100 ml of a graduated cylinder, followed by shaking vigorously and recording the volume (ml) of residual foam after 5 minutes.

(12) Water-resistance of dry film obtained from polymer emulsion

Each polymer emulsion in example 10 or comparative example 7 was spread on a slide glass, dried at 60° C. for 8 hours, and additionally dried at 20° C. for 24 hours, to obtain a dry film of 0.2 mm in thickness. The water-resistance of the film was tested by the drop-test measuring method of JIS (Japan Industrial Standard) K-6828 and required time (hours) was recorded.

(13) Adhesion properties of dry film obtained from polymer emulsion

On each dry film obtained in the above-mentioned manner from polymer emulsion in example 10 and comparative example 7, adhesive cellophane tape was applied respectively, and 180° peel strength between the dry film and the adhesive cellophane tape was measured. Calculated adhesive strength (g/cm) was recorded.

(14) COD of waste water from polymer emulsion

Each polymer emulsion in example 10 or comparative example 7, was demulsified by freezing at −10° C. for 24 hours and the polymer was filtered off through 150 mesh wire cloth, whereupon chemical oxygen demand (COD:ppm) of the filtrate was determined by the method of JIS K-0102.

preparation Example I (a comparative modifier composition)

Into a flask equipped with a stirrer, were charged 608 parts of nonaoxypropylene methacrylate, 1.05 parts of hydroquinone monomethyl ether (hereinafter referred to as MQ) and 304 parts of ethylene dichloride, and stirred to dissolve uniformly. The atmosphere in the flask was substituted with nitrogen. Then 140 parts of chlorosulfuric acid were added dropwise for 10 hours at −3° to 5° C., with removal of hydrogen chloride gas. 430 parts of 20% aqueous solution of sodium hydroxide were added dropwise at −3° to 5° ⦁ C. The pH of the solution was 6.5.

The by-products of sodium sulfate and sodium chloride were filtered off by using 30 parts of adsorbent [RADIOLITE#600 (produced by SHOWA CHEMICAL Ind.)], followed by distillating off ethylene dichloride at 45° C. under a reduced pressure of 150 torr, to obtain 1,336 parts of an aqueous modifier composition (Y-1), containing 668 parts of a compound (1) illustrated by formula (1-1). The modifier composition of comparative example (Y-1) contained 1,500 ppm of MQ and no copper ion as an inhibitor based on the compound(1).

Preparation Example 2 (a comparative modifier composition)

Preparation Example 1 was repeated, except using 0.385 part of copper dichloride dihydride in place of MQ, and 34 parts of KYOWARD#1000 and 68 parts of KYOWARD#700SL (produced by KYOWA CHEMICAL Ind.) in place of RADIOLITE#600, to obtain 1,265 parts of a modifier composition (Y-2), containing 632 parts of aqueous compound (1) illustrated by formula (1-1). The modifier composition of comparative example (Y-2) contained 10 ppm of copper ion and no MQ as an inhibitor.

Preparation Example 3 (a modifier composition of the present invention)

Into a flask equipped with a stirrer, were charged 608 parts of nonaoxypropylene methacrylate, 0.385 part of copper chloride dihydride, 1.05 parts of MQ, 6.1 parts of urea and 126.1 parts of sulfamic acid, followed by providing the flask with an atmosphere of nitrogen. The mixture was heated under stirring to 90° C., and stirring was continued for 10 hours.

The mixture was cooled to 30° C., followed by adding 705 parts of 1,2-dichloropropane, under stirring. Then 105 parts of an adsorbent [KYOWARD#1,000/#700SL (34parts/66 parts), produced by KYOWA CHEMICAL Ind.)]were added, and stirring was continued for 9 hours, followed by filtration. Thereafter, 648 parts of water were added, followed by distilling off 1,2-dichloropropane under a reduced pressure of 60 torr at 35° C.

Then 117.5 parts of a 30% aqueous sodium hydroxide solution were added dropwise over 5 hours, with distillation of ammonia water under a reduced pressure of 60 torr at room temperature, to obtain 1,296 parts of aqueous modifier composition (X-1), containing 620 parts of a compound (1) illustrated by formula(1-1). The modifier composition (X-1) in accordance with the present invention, contained 1,500 ppm of MQ and 2 ppm of copper ion respectively.

Preparation Example 4 (a modifier composition of the present invention)

Preparation Example 3 was repeated, except using 1.2 parts of phenothiazine in place of MQ, to obtain 1,296 parts of aqueous modifier composition (X-2), containing 620 parts of a compound (1) illustrated by formula (1-1). The modifier composition (X-2), in accordance with the present invention, contained 1,000 ppm of phenothiazine and 3 ppm of copper ion respectively.

Preparation Example 5 (a modifier composition of the present invention)

Preparation Example 3 was repeated, except using 580 parts of random heptaoxypropylene dioxyethylene methacrylate in place of nonaoxypropylene methacrylate, to obtain 1,280 parts of aqueous modifier composition (X-3), containing 600 parts of compound (2) illustrated by formula (1-2). The modifier composition (X-3), in accordance with the present invention, contained, 600 ppm of MQ and 1 ppm of copper ion respectively.

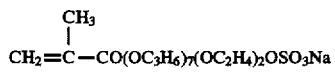
(1-2)

Preparation Example 6 (a modifier composition of the present invention)

Preparation Example 3 was repeated, except using 580 parts of random heptaoxypropylene dioxyethylene acrylate in place of nonaoxypropylene methacrylate, to obtain 1,280 parts of aqueous modifier composition (X-4), containing 595 parts of a compound (3) illustrated by formula (1-3). The modifier composition (X-4), in accordance with the present invention, contained 1,000 ppm of MQ and 1 ppm of copper ion respectively.

$$CH_2=CH-CO(OC_3H_6)_7(OC_2H_4)_2\,OSO_3Na \quad (1\text{-}3)$$

Preparation Example 7 (a modifier composition of the present invention)

Preparation Example 2 was repeated, except using 0.385 parts of copper chloride dihydride and 1.05 parts of MQ, to obtain 1,265 parts of aqueous modifier composition (X-5), containing 632 parts of the compound (1) illustrated by formula (1-1). The modifier composition (X-5), in accordance with the present invention, contained 1,500 ppm of MQ and 10 ppm of copper ion respectively.

Preparation Example 8 (a comparative modifier composition)

Preparation Example 3 was repeated, without using copper chloride dihydride, to obtain 1,280 parts of aqueous modifier composition (Y-3), containing 595 parts of a compound (1) illustrated by formula (1-1). The comparative modifier composition (Y-3), in accordance with the present invention, contained 1,500 ppm of MQ and no copper ion.

Examples 1-5 and Comparative Example 1-3

With regard to modifier compositions (X-1)-(X-5), of the invention and comparative modifier compositions (Y-1), (Y-2) and (Y-3), obtained from Preparation Examples 1-8, without any addition, polymer contents of by-product during preparation and storage, and polymerization conversions were measured by HPLC. The results are shown in Table 1.

Example 6-9

Modifier compositions, (X-6)-(X-9) of the present invention were obtained, by adding copper dichloride dihydride, MQ and sodium citrate into the comparative modifier compositions of example (Y-1) and modifier composition of comparative example (Y-2), respectively in accordance with the formulation shown in Table 1, followed by stirring to dissolve uniformly. Polymer contents of by-product during preparation and storage, and polymerization conversions were measured by HPLC. The results are shown in Table 1.

Comparative Example 4-6

Comparative modifier compositions, (Y-4), (Y-5) and (Y-6) were obtained, by adding copper dichloride dihydride and MQ into the comparative modifier compositions examples (Y-1), (Y-2) and the modifier composition of the present invention (X-1), respectively in accordance with the formulations shown in Table 1, followed by stirring to dissolve uniformly.

TABLE 1

| No | *1 | *2 | Cu | MQ | PT | SC | *3 | *4 | *5 |
|---|---|---|---|---|---|---|---|---|---|
| Example | | | | | | | | | |
| 1 | X-1 | X-1 | 2 | 1500 | | | 0 | 0.1 | >97 |
| 2 | X-2 | X-2 | 3 | | 1000 | | 0 | 0.1 | >97 |
| 3 | X-3 | X-3 | 1 | 1500 | | | 0 | 0.1 | >97 |
| 4 | X-4 | X-4 | 1 | 1000 | | | 0 | 0.1 | >97 |
| 5 | X-5 | X-5 | 10 | 1500 | | | 0 | 0.1 | >97 |
| 6 | X-6 | Y-1 | 2 | 1500 | | | 0.2 | 0.1 | >97 |
| 7 | X-7 | Y-1 | 10 | 1500 | | | 0.2 | 0.1 | >97 |
| 8 | X-8 | Y-2 | 10 | 1000 | | | 0.2 | 0.2 | >97 |
| 9 | X-9 | Y-2 | 10 | 1000 | | 3000 | 0.2 | 0 | >97 |
| Comparative example | | | | | | | | | |
| 1 | Y-1 | Y-1 | 0 | 1500 | | | 0.2 | 50 | >97 |
| 2 | Y-2 | Y-2 | 10 | 0 | | | 0.2 | 45 | >97 |
| 3 | Y-3 | Y-3 | 0 | 1000 | | | 50 | 100 | — |
| 4 | Y-4 | Y-1 | 30 | 1500 | | | 0.2 | 0 | <97 |
| 5 | Y-5 | Y-2 | 10 | 45 | | | 0.2 | 30 | >97 |
| 6 | Y-6 | X-1 | 10 | 3500 | | | 0 | 0.1 | <97 |

*1: kind of modifier composition after formulation
*2: kind of based modifier composition used for formulation
*3: polymer content of by-product during preparation
*4: polymer content of by-product during storage
*5: polymerizability
Cu: content (ppm) of copper ion
MQ: content (ppm) of hydroquinone monomethyl ether
PT: content (ppm) of phenotiazine
SC: content (ppm) of sodium citrate based on the weight of active ingredients of composition (without water)

Example 10

Into a glass mold, a mixture of 50 parts of methyl methacrylate, 2 parts of dehydrated modified composition (X-1) and 0.1 part of lauroyl peroxide was poured, and heated at 60° C. for 4 hours to obtain a transparent glassy polymer plate of 2 mm thickness. Polymerization conversion was 99.9%. Surface resistivity was $5\times10^{11}\Omega$ and this polymer had good antistatic properties.

Example 11

Into a flask equipped with a stirrer and a dropping funnel, were charged 1.6 parts of modifier composition (X-1), 22 parts of styrene, 18 parts of butyl acrylate, 117.5 parts of deionized water, 0.16 part of ammonium persulfate and 0.08 part of sodium bicarbonate, and emulsified under stirring. After the atmosphere in the flask was substituted with nitrogen, the mixture was polymerized at 75° C. for 0.5 hours. Then an emulsified mixture of 5.6 parts of modifier composition, 77 parts of styrene, 63 parts of butyl acrylate, 134.5 parts of deionized water, 0.56 part of ammonium persulfate and 0.28 part of sodium bicarbonate, was added thereto dropwise for 2 hours, followed by polymerization at 80° C. After addition of 18 parts of 1% aqueous ammonium persulfate and elevation of temperature up to 85° C., followed by polymerization for 2 hours, a modified polymer emulsion of the present invention (Z-1) was obtained.

Comparative Example 7

A modified polymer emulsion was prepared in the same manner as in Example 11, except using the same amount of dodecylbenzenesulfonic acid sodium salt in place of modifier composition (X-1), to obtain comparative modified polymer emulsion (Z-2).

Comparative Example 8

Example 11 was repeated, except using sulfopropyl methacrylate sodium salt in place of the modifier composition of the present invention. However, attempts to polymerize failed to provide any polymer.

Polymerization conversion, content of produced agglomerate, mechanical and chemical stability of polymer emulsion, foaming properties, water-resistance and adhesion property of dry films were measured and evaluated. The results are shown in Table 2.

|  | Example 11 (Z-1) | Comparative example 7 (Z-2) |
|---|---|---|
| Polymerization conversion (%) | 99.8 | 95.0 |
| Content of agglomeration (%) | 0.05 | 1.00 |
| Mechanical stability (%) | 0.04 | 1.20 |
| Chemical stability (%) | at least 500 | 6 |
| Foaming properties (ml) | 0.5 | 65 |
| Water-resistance (hours) | at least 500 | 10 |
| Adhesive strength (g/cm) | 450 | 250 |
| COD content (ppm) | 90 | 6,800 |

This application is based on Japanese Patent Application 7-086452, filed with the Japanese Patent Office on Mar.16, 1995, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A modifier composition suitable for use in providing a modified polymer, comprising;

(1) a compound represented by formula (1):

wherein R is a hydrogen atom or a methyl group, A is an alkylene group having 2–4 carbon atoms, $(OA)_n$ indicates a polyoxyalkylene group, M is a monovalent or divalent cation, n is 2–30, and m is 1 or 2;

(2) 50–3,000 ppm, based on total weight of the composition, of an organic polymerization inhibitor selected from the group consisting of phenols, hydroquinones and amines; and (3) 0.01–20 ppm of copper ion, based on total weight of the composition.

2. The composition of claim 1, wherein said organic polymerization inhibitor is hydroquinone monomethyl ether.

3. The composition of claim 1, wherein said organic polymerization inhibitor is phenothiazine.

4. The composition of claim 1, wherein said polyoxyalkylene group comprises at least 2 oxypropylene units.

5. The composition of claim 1, further comprising 300–3,000 ppm of a buffering agent, based on total weight of the composition.

6. The composition of claim 5, wherein said buffering agent is sodium hydrogen citrate or sodium citrate.

7. A modified polymer, comprising a polymer of at least one ethylenically unsaturated monomer, modified with a modifier composition comprising;

(1) a compound represented by formula (1):

wherein R is a hydrogen atom or a methyl group, A is an alkylene group having 2–4 carbon atoms, $(OA)_n$ indicates a polyoxyalkylene group, M is a monovalent or divalent cation, n is 2–30, and m is 1 or 2;

(2) 50–3,000 ppm, based on total weight of the modifier composition, of an organic polymerization inhibitor selected from the group consisting of phenols, hydroquinones, and amines; and (3) 0.01–20 ppm of copper ion, based on total weight of the modifier composition.

8. The modified polymer of claim 7, wherein said organic polymerization inhibitor is hydroquinone monomethyl ether.

9. The modified polymer of claim 7, wherein said organic polymerization inhibitor is phenothiazine.

10. The modified polymer of claim 7, wherein said polyoxyalkylene group comprises at least 2 oxypropylene units.

11. The modified polymer of claim 7, wherein said modified polymer is a copolymer of said at least one ethylenically unsaturated monomer with 0.1–20% by weight of said compound of formula (1), based on the weight of the modified polymer.

12. The modified polymer of claim 11, wherein said modified polymer is obtained by polymerizing said at least one ethylenically unsaturated monomer in the presence of said modifier composition.

13. The modified polymer of claim 7, wherein said modifier composition further comprises 300–3,000 ppm of a buffering agent, based on total weight of said modifier composition.

14. The modified polymer of claim 13, wherein said buffering agent is sodium hydrogen citrate or sodium citrate.

15. The modified polymer of claim 13, wherein said modifier composition is present in amount of 0.1–10% by weight based on total weight of the modified polymer.

16. A process for producing a modified polymer, which comprising polymerizing at least one ethylenically unsaturated monomer in the presence of a modifier composition comprising;

(1) a compound represented by formula (1):

wherein R is a hydrogen atom or a methyl group, A is an alkylene group having 2–4 carbon atoms, $(OA)_n$ indicates a polyoxyalkylene group, M is a monovalent or divalent cation, n is 2–30, and m is 1 or 2;

(2) 50–3,000 ppm, based on total weight of the modifier composition, of an organic polymerization inhibitor selected from the group consisting of phenols, hydroquinones, and amines; and (3) 0.01–20 ppm of copper ion, based on total weight of the modifier composition.

17. The process of claim 16, wherein said monomer is polymerized by emulsion polymerization.

18. The process of claim 16, wherein said modifier composition is present in an amount of 0.1–10% by weight, based on total weight of the modified polymer.

* * * * *